Aug. 18, 1925. 1,549,812
P. SIEDLER
PROCESS AND APPARATUS FOR THE PRODUCTION OF CARBON DISULPHIDE
FROM ITS ELEMENTS
Filed Jan. 11, 1922
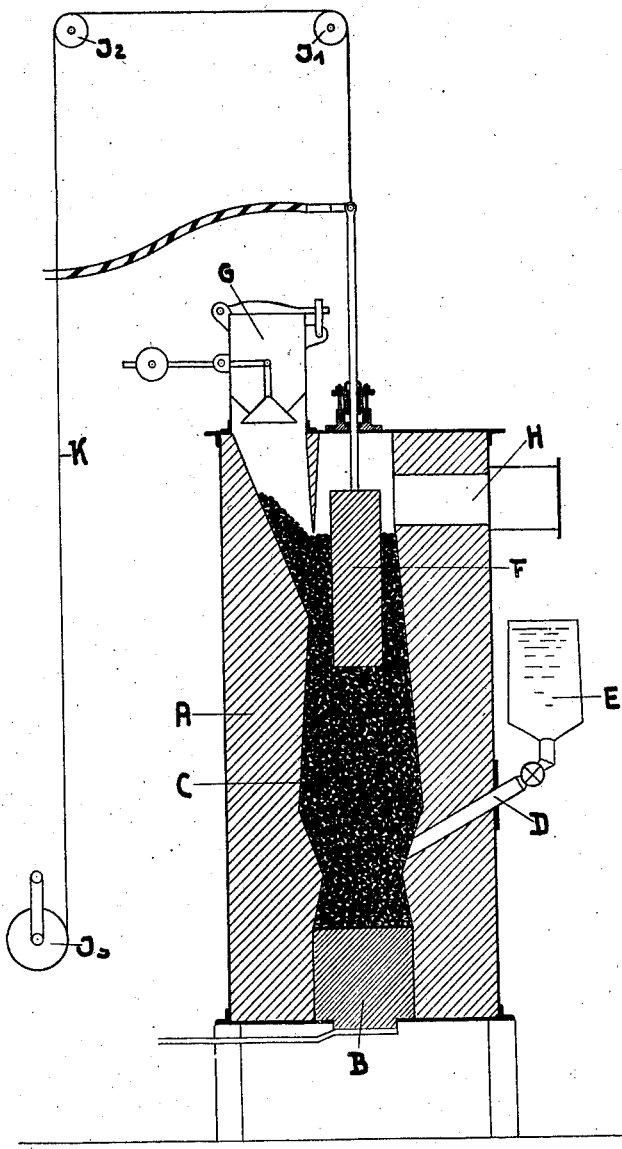
Inventor.
Philipp Siedler
by
Gifford N. Pull
his attorneys

Patented Aug. 18, 1925.

1,549,812

UNITED STATES PATENT OFFICE.

PHILIPP SIEDLER, OF GRIESHEIM-ON-THE-MAIN, GERMANY, ASSIGNOR TO FIRM CHEMISCHE FABRIK GRIESHEIM-ELEKTRON, OF FRANKFORT-ON-THE-MAIN, GERMANY.

PROCESS AND APPARATUS FOR THE PRODUCTION OF CARBON DISULPHIDE FROM ITS ELEMENTS.

Application filed January 11, 1922. Serial No. 528,360.

*To all whom it may concern:*

Be it known that I, PHILIPP SIEDLER, residing at Griesheim-on-the-Main, Germany, have invented certain new and useful Improvements in Processes and Apparatus for the Production of Carbon Disulphide from its Elements, of which the following is a specification.

The present invention relates to a process and apparatus for the production of carbon disulphide from its elements.

In view of the known high susceptibility of carbon disulphide to ignition in the course of production, a process was introduced some time ago for the production of carbon disulphide in an electric furnace instead of in a furnace heated by fire. This process consists essentially in that a heating zone is provided at the bottom end of a shaft in which by the aid of carbon fragments of good conductivity such as waste from arc-lamp carbons, and the like, a locally confined generation of heat is produced by the electric current. By this means the sulphur introduced through lateral channels into the bottom of the shaft is melted and brought to boiling. The shaft which is filled with charcoal is subjected to direct heating only at the lower part, which forms the zone of reaction; the upper part serves merely for cooling and partly as purifier for the carbon disulphide produced in the lower zones.

New experiments have proved that the velocity of formation of carbon disulphide from its constituents increases with the temperature to an unexpected degree, and that by suitably arranging the heating conditions, the output of an electrically heated furnace can be increased to a very considerable extent. In contrast of the known process it has been found advantageous to use the shaft not for cooling but mainly as extended heating zone, and to discard the one-sided bottom heating. This mode of working is greatly assisted by the fact that charcoal introduced into the shaft in an incandescent condition (or also cold if it has previously been submitted to calcination at about 600°) possesses or acquires such a high conductivity that, even with a moderate voltage between a bottom electrode and an electrode movable in the shaft, a carbon column several metres high can be brought to such a temperature that a brisk reaction with the sulphur vapour occurs. In the same manner as charcoal other porous kinds of carbon such as coked peat and the like, may be used. It is also advantageous to constrict the shaft at a point low down in such a way that the reduction in the cross section causes a considerable increase in temperature. The sulphur which is preferably melted outside the furnace is admitted near this point, and volatilizes as fast as it is run in.

In order to understand the invention more clearly reference is made to the accompanying drawings, which show in a diagrammatic manner an embodiment of the invention.

The brick shaft A in the iron mantle of the furnace is provided at the bottom with an electrode B, above which the shaft is constricted at C, and near the latter is the feed opening D for the sulphur which enters from the heated vessel E. The movable electrode F rests freely on the layer of charcoal in the shaft A and is furthermore surrounded by the coal supplied by the hopper G. The flue H serves for the escape of the carbon disulphide vapours which are conducted, in known manner, into a condensing plant. The rope K is passed over the rollers $J^1$, $J^2$, $J^3$, and enables the movable electrode F to be controlled by hand or in an automatic manner.

Having now particularly described and ascertained the nature of my said invention and in what manner the same is to be performed, I claim as my invention:—

1. The process of producing carbon disulphide which consists in maintaining a column of carbonaceous material, heating said column by passing an electric current longitudinally therethrough, introducing sulphur adjacent one end of said column, passing the produced vapors longitudinally therethrough and withdrawing said vapors adjacent the other end of said column.

2. The process of producing carbon disulphide which consists in maintaining a relatively long column of porous carbonaceous material, heating said column by passing an electric current longitudinally therethrough, introducing sulphur adjacent one end of said column, passing the produced vapors longitudinally therethrough and withdrawing said vapors adjacent the other end of said column.

3. The process of producing carbon disulphide which consists in maintaining a relatively long column of porous carbonaceous material, heating said column by passing an electric current longitudinally therethrough, introducing sulphur adjacent one end of said column, passing the produced vapors longitudinally therethrough, withdrawing said vapors adjacent the other end of said column, and regulating the temperature of said column by altering the distance between the electrodes.

4. An elongated receptacle adapted to be filled with carbon, means for passing electric current through said carbon, and comprising electrodes located at or near the opposite ends of said receptacle, a constricted portion adjacent one end thereof, means for introducing sulphur at or near said constricted portion, means for withdrawing carbon disulphide from the other end thereof, and means for moving the upper electrode toward and away from said lower one.

5. A furnace for producing carbon disulphide comprising a shaft adapted to be fitted with carbon, means for passing electric current through said carbon and comprising electrodes located at or near the opposite ends of said receptacle, a constricted portion adjacent one end thereof, means for introducing sulphur at or near said constricted portion and means for withdrawing carbon disulphide vapor from the other end thereof.

6. The process of producing carbon disulphide which consists in maintaining a relatively long column of carbonaceous material, heating said column by passing an electric current longitudinally therethrough and subjecting a portion of the column to a more intense heat at a point near one end thereof and introducing liquid sulphur adjacent said point passing the vapors through the unrestricted part and removing the carbon disulphide produced.

7. The process of producing carbon disulphide which consists in maintaining a relatively long column of carbonaceous material, heating said column by passing an electric current longitudinally therethrough and subjecting a portion of the column to a more intense heat at a point near one end thereof and introducing liquid sulphur adjacent said point passing the vapors upwardly through the unrestricted part and removing the carbon disulphide produced.

In testimony whereof I affix my signature in presence of two witnesses.

Dr. PHILIPP SIEDLER.